United States Patent
Khanchi et al.

(10) Patent No.: US 9,197,565 B2
(45) Date of Patent: Nov. 24, 2015

(54) NETWORK CONGESTION PREDICTION

(71) Applicant: Magor Communications Corp., Ottawa (CA)

(72) Inventors: Aziz Khanchi, Ottawa (CA); Shervin Shirmohammadi, Ottawa (CA); Mehdi Semsarzadeh, Ottawa (CA); Abbas Javadtalab, Gatineau (CA)

(73) Assignee: MAGOR COMMUNICATIONS CORP., Ottawa, ON (CA)

( * ) Notice: Subject to any disclaimer, the term of this patent is extended or adjusted under 35 U.S.C. 154(b) by 77 days.

(21) Appl. No.: 13/872,376

(22) Filed: Apr. 29, 2013

(65) Prior Publication Data

US 2013/0286837 A1     Oct. 31, 2013

Related U.S. Application Data

(60) Provisional application No. 61/639,531, filed on Apr. 27, 2012.

(51) Int. Cl.
*H04L 1/00* (2006.01)
*H04L 12/801* (2013.01)
*H04L 12/825* (2013.01)

(52) U.S. Cl.
CPC .............. *H04L 47/127* (2013.01); *H04L 47/11* (2013.01); *H04L 47/263* (2013.01)

(58) Field of Classification Search
USPC ................. 370/229, 230, 235, 395.5–395.52
See application file for complete search history.

(56) References Cited

U.S. PATENT DOCUMENTS

| | | | |
|---|---|---|---|
| 7,796,517 B2 * | 9/2010 | Chen et al. ..................... | 370/235 |
| 2004/0240390 A1 | 12/2004 | Seckin | |
| 2007/0110000 A1 | 5/2007 | Abedi | |
| 2008/0144724 A1 | 6/2008 | Luo et al. | |
| 2008/0170500 A1 * | 7/2008 | Ito et al. ......................... | 370/235 |
| 2010/0118114 A1 | 5/2010 | Hosseini et al. | |

FOREIGN PATENT DOCUMENTS

WO         2010/051618 A1      5/2010

OTHER PUBLICATIONS

Khanchi et al, Continuous One-Way Available Bandwidth Change Detection in High Definition Video Conference, University of Ottawa, 16 pages, 2010.*

"Continuous One-Way Available Bandwidth Change Detection in High Definition Video Conferencing", Aziz Khanchi et al., Distributed and Collaborative Virtual Environment Research Lab (DISCOVER Lab), School of Electrical Engineering and Computer Science (EECS), University of Ottawa, 6 pages.

* cited by examiner

*Primary Examiner* — Frank Duong
(74) *Attorney, Agent, or Firm* — Marks & Clerk

(57) ABSTRACT

To control the transmission of real time transport packets over a network, incoming packets received over the network from a transmitter are monitored. A statistical analysis is performed on the received packets to determine network congestion. A message is sent to the transmitter to control a transmission parameter in accordance with the determined network congestion.

20 Claims, 10 Drawing Sheets

Shape History Table
(after processing a packet)

| Symbol | Name |
|---|---|
| $R_1$ | Last Packet Arrival Time |
| $T_H$ | Upper Threshold |
| $T_L$ | Lower Threshold |
| $t_1$ | Threshold Update Time |
| $t_2$ | Notification Hold Off Time |
| a | Gamma Shape Parameter |
| b | Gamma Scale Parameter |

Other Variables

NETWORK CONGESTION PREDICTION

CROSS REFERENCE TO RELATED APPLICATION

This invention claims the benefit under 35 USC 119(e) of U.S. provisional application No. 61/639,531, filed Apr. 27, 2012.

FIELD OF THE INVENTION

This invention relates to real time telecommunications over packet networks, and in particular relates to two-way video conferencing applications, but is also applicable to audio or one-way data communication. More specifically, the invention addresses the problem of application level bandwidth available seen by the receiver as it varies from moment to moment, for the transmission of data via an unreliable best effort distributed network, for example the Internet

BACKGROUND OF THE INVENTION

In order to display the best quality picture via a network of given bandwidth at a given remote endpoint there is considerable latitude in how the picture is encoded. For example, at the sending endpoint a codec must be negotiated, and then the encoder bit rate, the frame rate and the resolution must beset. As the bandwidth of the connection varies, as it does for example using the Internet, so the optimum encoding varies.

The simplest and least satisfactory encoding method is to choose a codec and setting requiring a minimum bandwidth, which makes it difficult to transfer High Definition (HD) videos. In one-way, non real time applications, e.g. TV buffering at the receive endpoint is commonly used to smooth out temporary fluctuations in bandwidth. However due to round trip delay requirements for real time communications it is desirable to minimize receive endpoint buffering.

It is known that encoding may be optimized by continuously measuring round-trip delay, that is to say the time taken for a test packet of data to be transmitted from the sending endpoint (i.e. the endpoint from which a video stream is to be sent) to the receiving endpoint plus the time taken for a test packet of data to be returned to the sending endpoint. RTCP (RFC 3550) is a known industry standard method for collecting statistics from a network connection. From an RTCP Receiver Report it is possible for an endpoint to calculate Round Trip Delay, Jitter, and Packet Loss. Magor U.S. patent application Ser. No. 12/289,946 teaches a method of optimizing video encoding using RTCP reports.

A shortcoming of known methods of optimizing video encoding is that they are affected by limitations of the reverse connection. That is to say optimization is based in part on round trip delay, the sum of the delay in the forward connection plus the reverse connection. Delay of signals traveling in the reverse direction, toward the source of video, has no bearing (more accurately no quantifiable bearing) on the quality of displayed video and may be significantly greater (or less) than the delay in the forward connection. In addition, there is no guarantee that RTCP packets travel through the same forward path from sender to receiver.

SUMMARY OF THE INVENTION

The present invention relates to a real time method by which statistics for the forward connection only can be determined. Thus when made available to a sending endpoint they allow encoding to be optimized, constrained only by characteristics of the connection to the receiver which can be expected in the immediate future.

Accordingly, the present invention provides a method of controlling the transmission of real time transport packets over a network, comprising: monitoring incoming packets received over the network from a transmitter; performing a statistical analysis of the received packets to determine network congestion; and sending a message to the transmitter to control a transmission parameter in accordance with the determined network congestion.

In an endpoint receiving data from a network, using only characteristics of the receive data stream (i.e. size of packets and packet arrival time) the prevailing network bandwidth is rapidly determined and the sending endpoint is requested to adjust it sending bit rate to suit.

The method will generate a sequence of Weighted Packet Inter-Arrival Times. A histogram of these is known to have a Pareto Distribution characterized by two parameters: $X_{min}$ ($x_m$) and $\rho$.

As each packet arrives a new average value of $\rho$ is calculated using a Bayesian technique. Two different moving averages are calculated from the stream of average $\rho$ values each time a new packet arrives. From these moving averages a stream of Differences is calculated. An upper and lower threshold is calculated dynamically based on recent values of the Differences.

If the instantaneous Difference is above the upper threshold or below the lower threshold a message indicating this event is sent to the endpoint which is the source of received data. This sending endpoint may then adjust or change video encoding parameters or method accordingly to change the transmit bit rate and thus optimize the rendering of the received picture.

Embodiments of the invention will deliver a better HD video conference viewer satisfaction for a given network latency (delay of the signal from transmit to receive endpoints). When the video signal is transmitted over a network carrying a given traffic load which varies according to typical variation experienced, for example on the Internet, embodiments of the invention will more quickly adapt the video transmission to the prevailing network bandwidth.

According to another aspect of the invention there is provided a real time communication system using a real time transport protocol, comprising a receiver for receiving the packets over a network from a remote transmitter and outputting a data stream; and a network congestion computation module at the receiver for determining network congestion based on incoming packets, said network congestion computation module being configured to perform a statistical analysis of the received packets to determine network congestion and to send a message to the transmitter to control a transmission parameter in accordance with the determined network congestion.

BRIEF DESCRIPTION OF THE DRAWINGS

The invention will now be described in more detail, by way of example only, with reference to the accompanying drawings, in which:—

DETAILED DESCRIPTION OF EMBODIMENTS OF THE INVENTION

Figure 1:
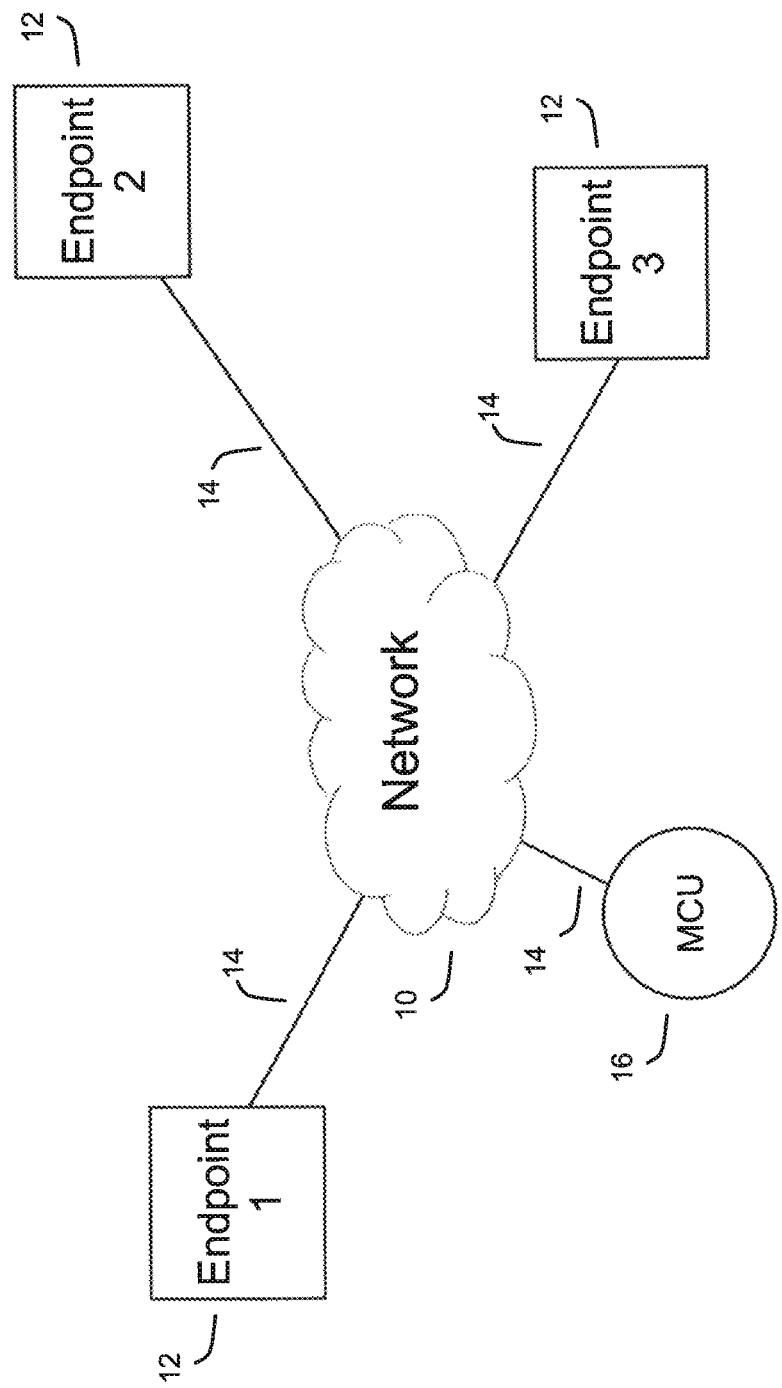
FIG. 1 illustrates a typical arrangement of conference equipment.

FIG. 1 illustrates a typical arrangement of video conference equipment. Endpoints 12 may support audio only, video and audio, and data, for example a PowerPoint presentation. A point-to point-call may be established between two endpoints 12 via a network 10. A multiparty mesh topology conference may be established between 3 or more endpoints 12. Star (or mixed) topology multiparty conferences may be established employing one (or more) Multipoint Conference Units (MCU) 16. In the preferred embodiment all network connections 14 are IP as is the Network 10. All connections and the Network are presumed unreliable, best effort.

Figure 2:
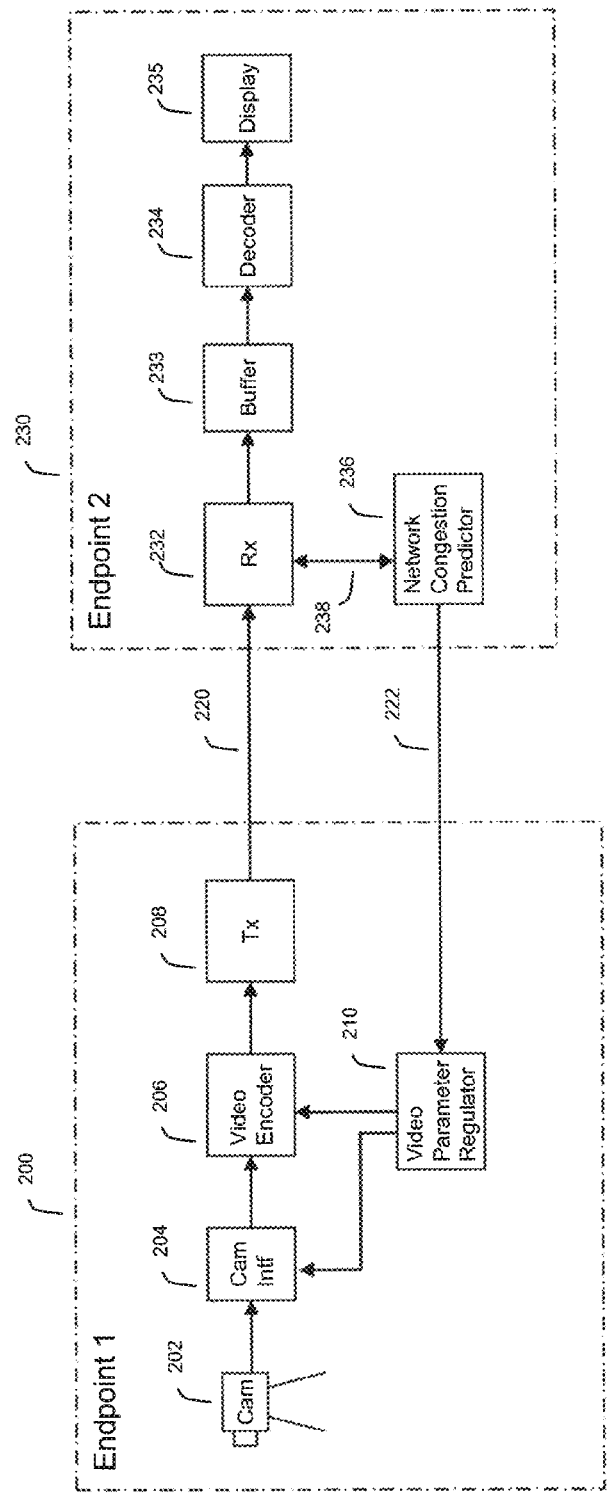
FIG. 2 is a block diagram of an arrangement with a network congestion predictor.

FIG. 2 shows a single, one way, communication of video from a camera 202, a part of source endpoint 200, to destination display 235, a part of endpoint 230.

Typical Endpoint 200 comprises known technology. A camera 202 is connected via interface 204 and encoder 206 to transmitter 208. A video parameter regulator 210 receives messages based on which it will adjust the transmitter 208 bit rate. This is done by adjusting each or any of the encoder bit rate, video frame rate and video resolution. Transmitter typically includes the IP protocol stack transmitting IP packets via connection 220 to endpoint 230.

Endpoint 230 is the destination endpoint including the receiver 232 followed by a buffer 233, a decoder or codec 234 and a display 235. It will be understood that in a multiparty conference, such as FIG. 1, multiple receivers 232 will be required. Similarly, although not important in the present invention, multiple buffers 233, decoders 234 or displays 235 may also be employed Network congestion predictor 236 is embodied in the Endpoint 230. It can request, e.g. via a known operating system call 238, from receiver 232 information about data packets received. For example it can request information about the most recent packet(s) received on connection 220. One skilled in the art would know how to request a particular operating system to raise an event each time a new packet was received on connection 220. Such an event may contain information including the time of arrival (time stamp) and size of the most recent packet received, or, a means (handle) to get such information.

Network congestion predictor 236 in the receiving endpoint communicates with the video parameter regulator 210 in the sending endpoint via connection 222 using any appropriate technology. The message details and method of sending depend on the video parameter regulator 210 but in one embodiment the SIP INFO method is used to send such messages. The SIP INFO method is documented in RFC 2976 and SIP: Session Initiation Protocol is documented in RFC 2543.

In the event that the endpoint is connected to more than one other endpoint, in for example a mesh topology conference, a number of alternatives are contemplated. In this case there will be multiple receivers 232 (a receiver is the logical termination of one network connection). One alternative is to instantiate multiple network congestion predictors 236, one for each distant video stream. Another alternative is to have a single network congestion predictor 236 adapted to support multiple receivers 232 as a group. In yet another combination of these alternatives receivers 232 are notionally grouped on some basis. For example one or more endpoints 200 may be located on the same premises and/or have more than one camera 202 resulting in multiple video connections 220 from a given endpoint or location. It may then be beneficial to group all the receivers associated with a particular location, endpoint or scene. In such a case a single network congestion predictor 236 could be instantiated for each receiver group. One skilled in the art will realize that such a network congestion predictor 236 could be adapted to treat all packets received in multiple receivers 232, e.g. displaying the same scene, or sent from the same location, as if they were all received in a single receiver. The method assumes that all packets traverse the same network path. Such adaptation would also require adaptation of 'Notify Sending Endpoint' process 628 to notify each of the sending endpoints, via multiple connections 222, respectively associated with each of the receivers in the receiver group.

Typically each connection 220 between endpoints can be more accurately described as a bundle of connections. That is to say the connection 220 includes a video connection(s), audio connection(s), data connection(s), and a call control connection. Any or all of these connections could be used in embodiments of this invention. In this exemplary embodiment only HD video packets from a single video stream are monitored and rate controlled.

Embodiments of the invention depend on a statistical analysis of the time spacing and sizes of UDP/RTP video packets in the receiver side to determine end-to-end bandwidth variations. No collaboration from the sender or network is required. Given the bursty nature of the arrival time for UDP packets, Bayesian statistics are used to harness and extract the congestion information.

For simplicity, only one queue of video packets that travel from a single sender to a single receiver through an unreliable network will be considered. The packets are time-stamped as they received by the receiver, they. The random process of inter-arrival times $D_i$ are defined as the difference in packet spacing at the receiver side for a pair of subsequent packets. If $R_i$ is the arrival time in timestamp units for packet i, then $$D_i = (R_i - R_{i-1}). \tag{1}$$

It should be noted that there is no guarantee that the video packets arrive in order. The inter-arrival process used in the present invention is not therefore the same as that used in regular jitter and real-time applications.

Due to the variable packets sizes, the weighted values $J_i$ of $D_i$ defined are as $$J_i = \frac{D_i}{\text{Size of packet}(i)}. \tag{2}$$

Figure 3:
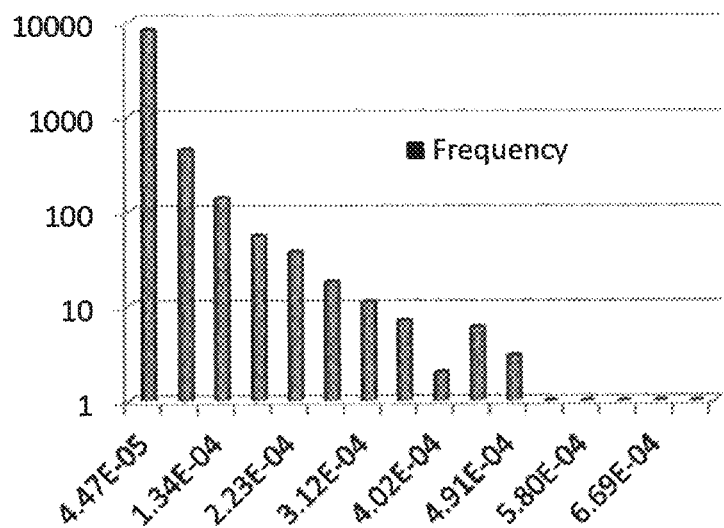
FIG. 3 is a histogram of inter-arrival times over packet sizes for Internet data.

It has been found that the random variable $J_i$ is heavily tailed and approximately fits a Pareto distribution as shown in FIG. 3.

The probability density function of a Pareto random variable with parameters $\rho$ and $\chi_M$ is $$f(x \mid \rho, x_M) = \frac{\rho x_M^\rho}{x^{\rho+1}}, \, x \geq x_M > 0, \rho > 0, \quad (3)$$

where $\chi_M$ is the minimum possible value of the random variable and $\rho$ is the shape parameter.

Figure 4:
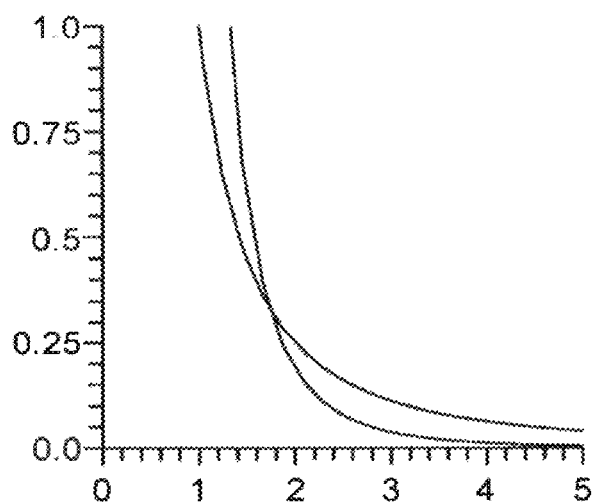
FIG. 4 shows the probability density functions of Pareto distributions with $X_M=1$

This random variable is heavy-tailed and has a finite average only if $\rho>1$, has variance if $\rho>2$, skewness if $\rho>3$, and kurtosis if $\rho>4$. Due to the nature of Internet traffic, most Internet data with Pareto distribution have shape parameter p<2, and consequently there is slim hope for the existence of mean and variance. Because there is no guarantee for the existence of statistical central tendency (mean) and dispersion (variance, standard deviation) parameters, it might be thought developing any method based on these parameters would lead to unreliable solutions. In addition, Internet data is known to exhibit self-similarity, burstiness and long-range dependence. However, it should be noted that as the shape parameter becomes larger, the distribution has a lighter tail and the chance for encountering larger weighted inter-arrival times decreases. As $\rho$ decreases, the distribution has a fatter tail as shown in FIG. 4. The curve with the heavier tail corresponds to $\rho=3$ and the other curve is the density function when $\rho=5$.

Throughout an HDVC session for all i's the random variable $J_i$ can be considered to have a Pareto distribution with fixed parameters (minimum and shape). The described congestion control method uses these fixed parameters. However, due to the complex nature of Internet communications and traffic, it is reasonable to think of the parameters as random variables that vary over time. This time-varying perspective will harness the unpredictable behavior of bandwidth variations. In other words, if it is accepted that Ji follows a Pareto distribution, there is no reason that to accept universal values for the parameters because these parameters may change over time during a single HDVC session. Bayesian statistics are applied to develop the forecasting and congestion control scheme. Assuming that we have a reasonable estimate of the minimum parameter $x_M$, this information can be obtained from previous experience or it can simply chosen as suitable guess, although it should not be much smaller than the actual minimum. From this point, the only unknown factor in the Pareto distribution is the shape parameter, p, which is a new random variable. As a random variable, the shape parameter needs a distribution by itself. In Bayesian statistics, it is well-known that the conjugate distribution for the shape parameter of a Pareto distribution with known minimum, $x_M$, is the gamma distribution.

The choice of the gamma distribution guarantees that as the information is dynamically updated according to weighted inter-arrival times, the distribution of $\rho$ does not alter from the gamma distribution. It will be assumed that $\rho \sim G(a, b)$ where $G(a,b)$ is the gamma distribution with mean and variance ab and $ab^2$, respectively.

At the beginning of the session, it is assumed that the shape parameter denoted by $\rho_o$ follows the gamma distribution $G(a_o, b_o)$, where $a_o$ and $b_o$ are predetermined and fixed. These fixed numbers can be chosen on the basis of previous information or some logical fixed positive numbers with the hope that the system will correct itself in a short period of time. Initially the mathematical expectation of $\rho$ is o.

When the first packet arrives, $J_i$ is calculated. This number is then fed into the following Bayesian equation implying that the posterior distribution of the shape parameter is:

$$G\left(\alpha_0 + 1, \left[\frac{1}{b_0} + \ln\frac{J_1}{x_M}\right]^{-1}\right) \quad (4)$$

As a result, based on the numerical value of $J_i$, $\rho$ follows a gamma distribution with average:

$$E(\rho) = (\alpha_0 + 1)\left[\frac{1}{b_0} + \ln\frac{J_1}{x_M}\right]^{-1}. \quad (5)$$

Once the second packet arrives and $J_2$ is calculated, it will be used to obtain a new estimation of the Pareto shape parameter:

$$\rho \sim G\left(\alpha_1 + 1, \left[\frac{1}{b_1} + \ln\frac{J_2}{x_M}\right]^{-1}\right) = G(\alpha_2, b_2), \quad (6)$$

$$E(\rho) = (\alpha_1 + 1)\left[\frac{1}{b_1} + \ln\frac{J_2}{x_M}\right]^{-1}.$$

This algorithm will be continued and after each packet arrival the expectation of the shape parameter is calculated, which will provide a sequence of mathematical expectations of the shape parameters. Note that for simplicity, we can write:

$$b_n^{-1} = \frac{1}{b_0} + \ln\left(\frac{\prod_1^n J_i}{x_M^i}\right) \quad (7)$$

$$\rho_n = E(\rho) = (\alpha_0 + n)b_n,$$

where pn represents the mathematical expectation of $\rho$ after the arrival of the nth packet.

Analysis of actual HDVC traces shows that variations of $E(\rho)$ highly depend on bandwidth fluctuations. Therefore, the described congestion control technique is based on comparing moving averages of $E(p)$.

A numerical sequence of the differences of the last moving averages of orders $n_1$ and $n_2$ ($n_1<n_2$) is generated prior to each packet arrival. When the ith packet arrives (i>n2) the difference is determined as $$\text{Diff}_i = MA_i(n_1) - MA_i(n_2), \quad (8)$$

where $$MA_i(n) = \frac{\sum_{i-n+1}^{i} \rho_i}{n} \text{ for } i \geq n \quad (9)$$

The moving average technique was chosen because it provides us with a smoother curve. The following are exemplary numerical values for the orders of moving averages: n1=20 and n2=50. However, the order of the moving averages can be adjusted according to specific applications. Larger values of n would provide smoother curves at the expense of delay in detecting bandwidth variations. Moreover, during an HDVC session different orders of moving averages can be used depending on the smoothness required.

There seems to be an association between long-range average rate of change of $(\rho n)_{n\geq 1}$ and bandwidth variations. However, it was found that the average rate of change could not be used because the graph of $(\rho n)_{n\geq 1}$ has extreme nonlinear properties over short periods of time.

A sharp decline in numerical value of Diff indicates a decrease in bandwidth and, analogously, a rise in Diff shows an increase in bandwidth. In other words, the sender's video rate can be adjusted according to $Diff_i$ fluctuations. $Diff_i$ is therefore sampled in a fraction of a second and generate lower and upper bounds for its curve. The bounds should stay constant until the next sampling. Once $Diff_i$ crosses the lower (upper) bound it indicates a decrease (an increase) in the bandwidth. The steps below demonstrate the overall scheme:

Step 1: Determine arrival time and size of packets upon arrival at the receiver's side.
Step 2: Use equation (7) to update the expected value of $\rho$.
Step 3: Evaluate Diff using equation (8).
Step 4: Generate lower and upper bounds every fraction of second.
Step 5: Send the information to sender to decrease or increase the video bit rate according to bound crossings.

Figure 5:
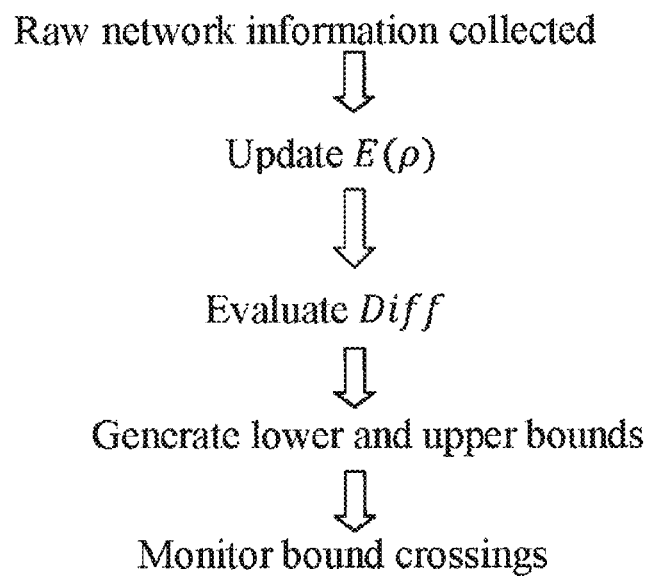
FIG. 5 shows an algorithm in accordance with an embodiment of the invention.

The outline of the algorithm is shown in FIG. 5.

Experimental Results

Two experiments were performed using an NS2 simulator, which is an open-source network simulator, and real traces using Magor Corporation equipment.

At the very beginning of the video session, there is an initial period of constant increase in video bit rate. It is necessary to wait a reasonable amount of time to pass this period of time.

Let $\Delta_1$ be a fraction of a second, say $\Delta_1$ is between 0.25 sec and 1 sec. This number can be adjusted as needed, and is the wait time to generate a new set of lower and upper bounds, if there is no change in video bit rate.

Let $\Delta_2$ be slightly larger than the amount of time it takes us to adjust the video rate; i.e., the amount of time it takes for the video bit rate to match itself to the requested bit rate.

If there is a change in video bit rate due to the proposed algorithm, the system will wait $\Delta_2$ seconds to generate the bounds.

Considering steps 1, 2, and 3, once Diff is sampled, the lower and upper bounds are generated according to the following rules:

If the first nonzero decimal of Diff is of order $10E^{-2}$, then the bounds should be Diff±0.02.

Otherwise, if the first nonzero decimal of Diff is of order $10E^{-n}$, where n≥3 where n≥3 then the bounds should be Diff±1.5E(−n+1).

A crossing of upper bound should indicate an increase in the bandwidth and a crossing of the lower bound indicates a decline in the bandwidth.

In addition to step 5, the size of change in Diff may be monitored to assess amount of bandwidth variations. Layers of bounds may also be created to forecast the size of bandwidth variations.

The first experiment involves transferring a video for 12 seconds using the NS2 simulator.

The network bandwidth was adjusted according to Table 1.

TABLE 1

| sec | Bandwidth (Mbps) |
|---|---|
| 0-4 | 2 |
| 4-6 | 1 |
| 6-8 | 1.5 |
| 8-10 | 0.75 |
| 10-12 | 1 |

Once a bandwidth change is triggered, the video encoder instantaneously tries to reach the matching video bit rate. In this simulation, it takes 15 frames for the encoder to adapt itself to new bandwidth.

During the first second of the experiment the system experiences a huge loss. With the same video rate and available bandwidth there is no loss during the second 2 and the system experiences loss of during seconds 3 and 4 respectively. Because of these losses, a TCP-friendly congestion detection mechanism would actuate the video bit rate. However, the described method will not trigger a congestion control action.

Let's assume that the prior distribution of $\rho$ is Gamma with parameters
$a_o$=0.0869445, and
$b_o$=0.0047961631.

$$\rho_o = E(\rho) = a_o b_o = 0.000417 \quad (10)$$

As explained before, it is possible to start updating $E(\rho)$ once the first packet arrives. However, without loss of generality, it is possible to wait for the second packet arrival. Here is a list of required numbers to update $E(\rho)$.

First packet arrival time (sec)=0.009891
Second packet arrival time (sec)=0.014099
Size of the second packet (Mb)=1024
$\rho_1$=0.0052124887.

Figure 6:
FIG. 6 is a plot of expected values of ρ for an NS2 simulation.

The sequence of $(\rho_n)_{n\geq 0}$ serves as a reliability parameter. Using the Bayesian equation (7), the posterior distribution of $\rho$ is the Gamma distribution with parameters $a_1$=1.0869445 and $b_1$=0.0047955426. The association between $(\rho_n)_{n\geq 0}$ and bandwidth variations can be clearly seen in FIG. 6. From 7 it can also be seen that crossings of moving averages are correlated with bandwidth changes.

Figure 7:
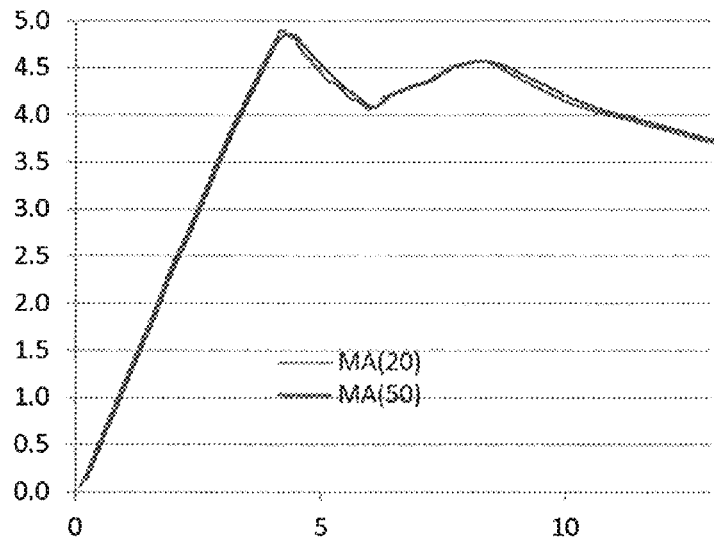
FIG. 7 is a graph of a parameter Diff plotted with sealed bandwidth.
Figure 8:
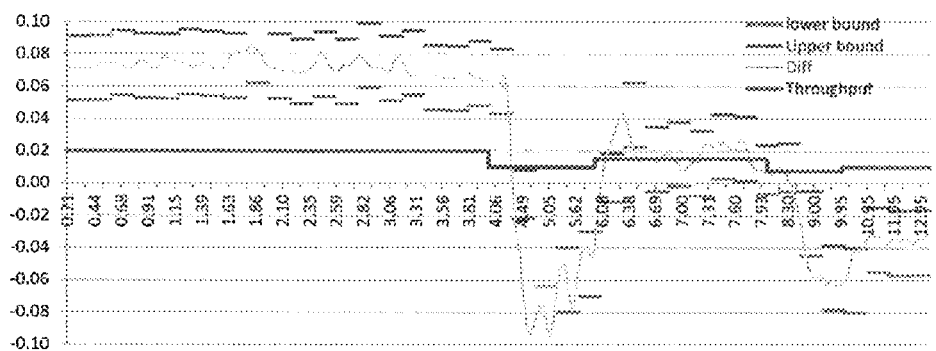
FIG. 8 shows the lower and upper bounds generated every 50 packet arrivals.

Diff=MA(20)−MA(50) is graphed in FIG. 7. For this experiment, $\Delta_1$ was dynamic and lower and upper bounds for Diff were updated every 50 packet arrivals. In addition, for simplicity $\Delta_2$ was set to zero. The lower and upper bounds are shown in FIG. 8.

Figure 9:
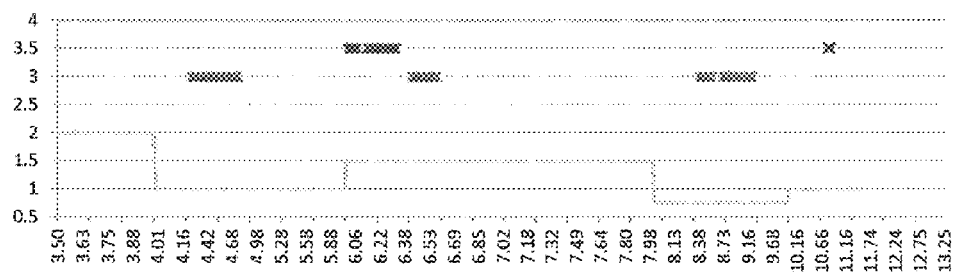
FIG. 9 shows the times to lower (crosses on 3) and increase (crosses on 3.5) the video rate plotted with available bandwidth.

The times to lower and increase the bandwidth are given in FIG. 9. There is only one false congestion report after the first increase detection which is partly because of taking $\Delta_2$=0. In addition, there are several bandwidth variation detections after the first spotting which is again a result of $\Delta_2$=0. The control method can be based on several consecutive alerts instead of just relying on the first one.

The second experiment involves a recorded file streamed from a site in Toronto to a destination in Ottawa for almost 45 seconds. The maximum bandwidth was limited to 2 Mbps and an equation-based congestion detection was used. It took the encoder one second to adjust itself to congestion detection instructions. Approximately after 10 seconds the network deteriorates and experiences severe loss (total of 274 packets) and the video bit rate was downshifted to below 1 Mbps. The congestion control then slowly increased the video bit rate over time. Moreover, at time of congestion the RTT (Round Trip Time) goes up to 150 ms.

Figure 10:
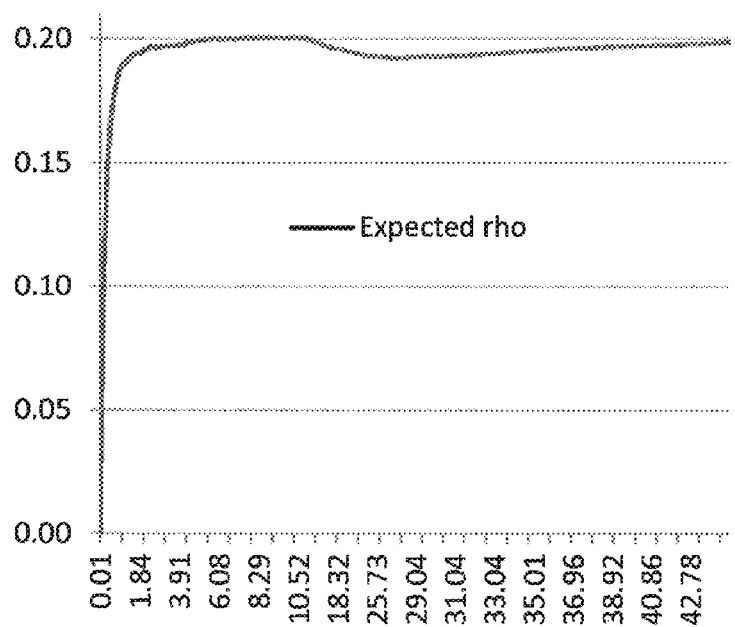
FIG. 10 shows Exp(ρ) for real Internet traces.

The results of this experiment are shown in FIG. 10, which is a graph of Exp($\rho$). The correlation between the curve and bandwidth variations is clear. The initial increase represents a constant bandwidth that accommodates video packets with no major problems. The sudden drop after around 10 seconds represents the bandwidth reduction and possibility of a severe congestion.

Operation of the network congestion predictor 236 will now be described in more detail with reference to FIGS. 11 to 15.

Figure 11:
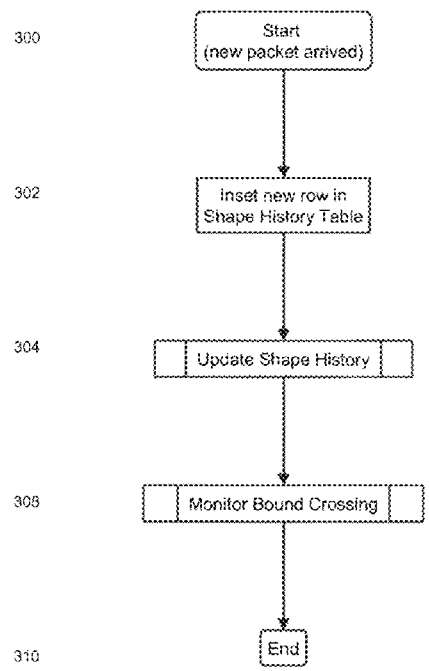
FIG. 11 is a network congestion predictor flow chart.

Flowchart FIG. 11 illustrates the basic process of the invention. It is event driven and starts at step 300 after a new video packet is received from connection 220. The event is, for example, passed by the operating system as described above. The event will have reference to an object, or parameters, associated with the event. Exact details on how this works depend on the computing environment. In the following, expressions starting with the word 'Get' are references to this object or parameters passed with the current event.

Figure 12:
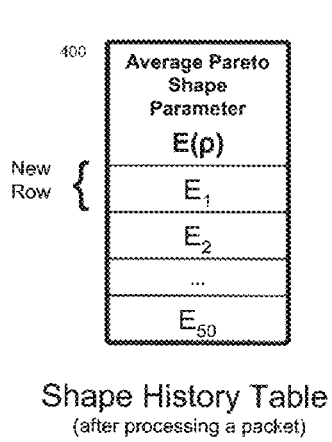
FIG. 12 is a chart showing persistent variables.

The first step 302 of the process is a housekeeping step in which a new empty row is added to a shape history table 400, see FIG. 12. It will be clear that the process must limit the number of rows by some means. In one embodiment the table is implemented as circular buffer with 50 entries (rows).

In the next step 304 a statistical distribution parameter is recalculated based on metrics of the most recent packet received and this parameter is added to a table (a list) of similarly calculated values. This sub-process will be described later in detail with reference to FIG. 13.

In the next step 308 moving averages of the values in this table are analyzed. If certain bounds are exceeded it is determined that the connection 220 bandwidth has changed and a notification is sent to the video source requesting it to adjust its transmit bit rate to better match the current network conditions. The bounds used are also periodically adjusted. This sub-process will be described later in detail with reference to FIG. 14.

Persistent variables used in the novel method are summarized in FIG. 12. These are variables, which exist (i.e. memory is allocated) for the duration of the video connection 220.

Shape History Table 400 (a global variable) contains the average Pareto shape parameter, E(ρ) or for brevity simply E, for packets received up to each of the last 51 packets. Initially the table is empty and fills as each of the first 51 packets are received. After that the 'E' value for each new packet is added and the 'E' value for the 51st packet is dropped. Note that the table row index runs from 1 to n. These rows correspond to subscripts i to i−n+1 respectively as used in the appendix e.g. equation (9).

Other exemplary values of global variables used and changed by the process are listed in table 400. The description and initialization of each of which follows:

TABLE 2

| Symbol | Description | Initial Value |
| --- | --- | --- |
| $R_1$ | Last Packet Arrival Time | Set to the arrival time of the very first packet received in the connection which is not otherwise processed. |
| $T_H$ | Upper Threshold | .02 |
| $T_L$ | Lower Thresholds | −.02 |
| $t_1$ | Threshold Update Time | $t + \Delta_1$ |
| $t_2$ | Notification Hold Off Time | $t + \Delta_2$ |
| a | Gamma Shape Parameter | .09 |
| b | Gamma Scale Parameter | .005 |

Initial values given are intended as a guide only. In particular, in one embodiment of the invention initial Gamma parameters a & b are equal to the values they had at the end of the previous video session to session. In a typical embodiment all constants may be optimized by a technician.

In the above table 't' refers to the current real time, i.e. at the moment the particular operation occurs. Real time is for example measured in ms since the computer was started.

$\Delta_1$ is the time, typically set between 0.25 sec and 1 sec, controls the frequency the upper and lower thresholds are calculated.

$\Delta_2$ is the time, typically more than 1 sec, that in the particular connection it takes for any change of bit rate requested by the network congestion predictor 236 to take effect, via video parameter regulator 210, camera interface 204 and video encoder 206, and settle in the receiver 232. It is typically calculated by the video call set-up process, which would start this novel process.

It will be evident to one skilled in the art that packet counts rather than timers may be more efficient for controlling the flow at decisions at steps 602 and 704 (to be described later).

Threshold values $T_H$ and $T_L$ may be set to the initial values indicated. However it is evident that depending on the choice of $t_1$ and $t_2$ the process, described later in FIG. 15, step 730 will be invoked before these initial values are ever used. In another embodiment the process starting at 730 may be called explicitly after the 51st packet has arrived, possibly using the packet count control mechanism or the previous paragraph.

Figure 13:
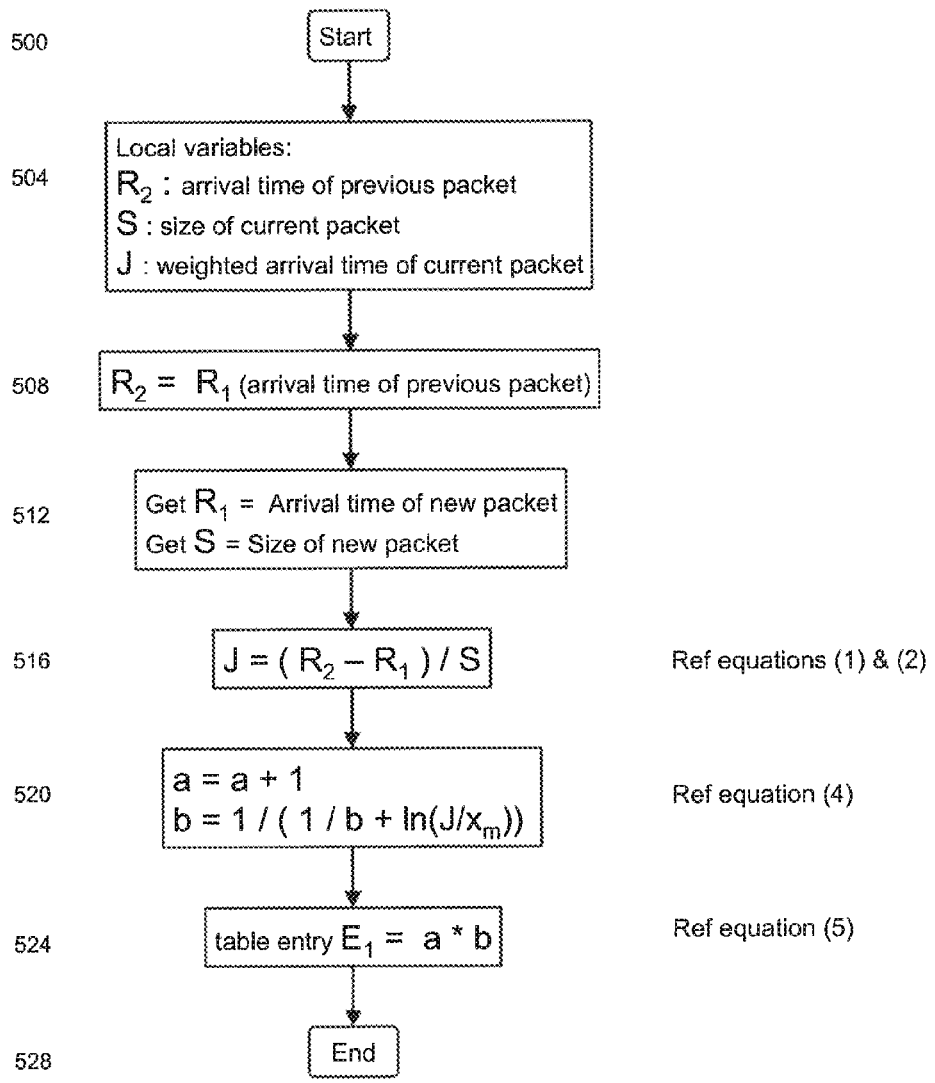
FIG. 13 shows an update shape history chart.

Referring to the process of FIG. 13, which is started at step 500 by the call at 304, variables used by this process are summarized (declared) at step 504.

At step 508 the arrival time of the previous packet (i.e. the one prior to the packet now being processed), which was stored in $R_1$ is copied into local $R_2$.

At step 512 $R_1$ and S, the arrival time and size respectively, of the newest packet are got from the parameters of the event that started the process 300.

The remaining three steps of the process 516, 520 and 524 correspond to equations (1), (2), (4) and (5).

The weighted arrival time (J) of the packet is calculated at step 516 according to the formula $(R_2 - R_1)/S$.

The mathematical basis of the method is that the sequence of J values will change over time with a Pareto distribution. In the mathematical literature a Pareto distribution is characterized by two parameters referred to as ρ (pronounced rho) and $x_m$ (pronounced x minimum).

Pareto distribution parameter ρ is sometimes referred to as the shape parameter α, or as the 'tail index'.

The Pareto distribution shape, indicated by the parameter, ρ, will also change over time when the bandwidth of connection 220 changes. The implementation assumes that the changing ρ values will, themselves, have a Gamma distribution from which an average ρ value, E(ρ), may be calculated. In mathematical theory two parameters a and b (see FIG. 4 table 420) describe the Gamma distribution. From these parameters the average value may easily be calculated as their product. It is guaranteed in Bayesian statistics theory that the distribution of ρ would be the Gamma distribution throughout the application.

Values a and b, table 420, are updated in step 520. The value of a is incremented by one.

The value of b is updated using the previous value of b according to the formula $1/(1/b + \ln(J/x_m))$, where 'ln' means natural logarithm, J is from step 516 and $x_m$ is a second parameter of the assumed Pareto distribution. $x_m$ is a constant, not zero and positive, equal to the estimated minimum value of the weighted inter-arrival times. In the embodiment of the invention a value of 4E-6 was used.

A period of time in any computing environment the value of a will overflow and/or calculation of b will loose accuracy. This matter will be dealt with in reference to FIG. 15.

The average value of the current Gamma distribution, E, is calculated at step 524 as the product of a and b and is saved in the table 400 as $E_1$ after which the process ends 528 and returns to the calling process 304.

Figure 14:
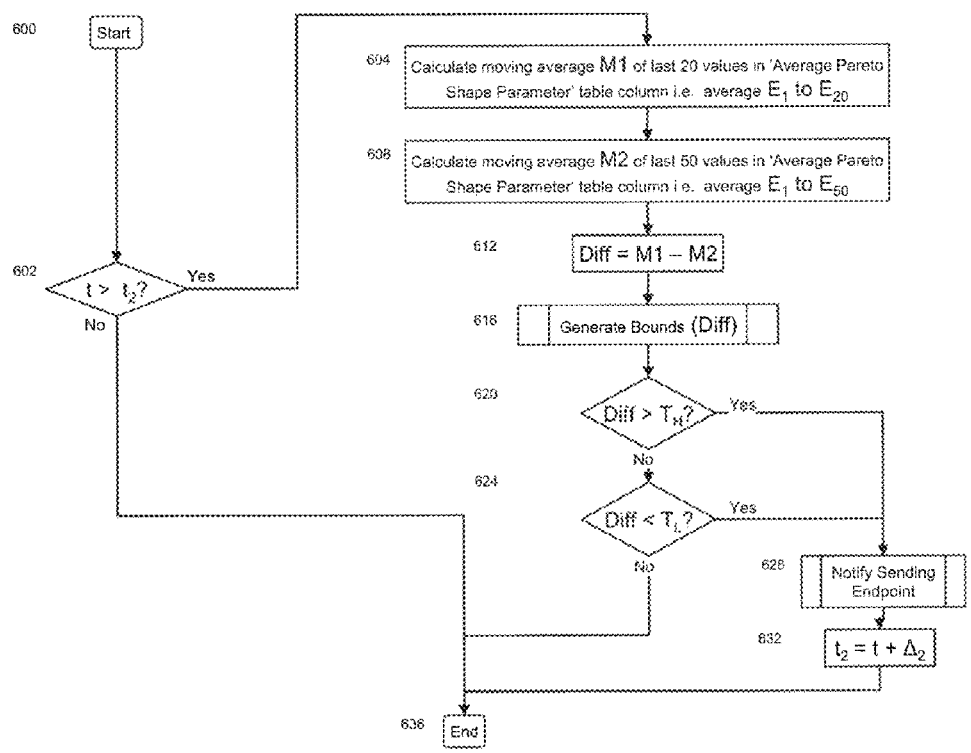
FIG. 14 is a chart showing monitor bound crossing.

The final step in FIG. 11, sub process 308, is explained with reference to FIG. 14, monitor bounds crossing, starting at step 600.

First a test is made at step 602. If the current real time (t) is not greater than $t_2$, the notification hold off time, then no further action occurs, and the sub process ends at step 636.

Otherwise two moving averages of the E values in table 400 are calculated. In one embodiment M1 step 604 is based on the 20 most recent E values, i.e. $E_1$ to $E_{20}$. M2 step 608 is based on the 50 most recent E values (i.e. all E values) in table 400. Other ranges could be used. The method of calculating average is well known and simply involves adding up a series of values and dividing by the number of values.

The remainder of the process depends on the difference, Diff, of these two moving averages calculated at step 612.

A call is made to further sub process, generate bounds, at step 616, which occasionally modifies $T_H$, $T_L$, used in the next steps, and other values.

A decision-making process then follows based on the Diff. If Diff is greater than the upper threshold $T_H$ 620, or Diff is less than the lower threshold $T_L$ 624 the process moves to step 628; otherwise it ends at step 636 and no notification is sent, this being the typical case.

If either threshold is exceeded, then it has been determined that there is insufficient (or excess) available bandwidth in the connection 220 for the video stream being transmitted and the rate must (or can) be changed. In this case process moves to notify sending endpoint 628, where a call is made, typically to an operating system service, to send a message (e.g. using SIP protocol) to the video sending endpoint. This message is sent via connection 222 but a connectionless protocol may alternatively be used to send the message. The content of the message is, in its simplest, an indication that video parameters should be adjusted to either decrease (if Diff is greater than the Upper Threshold variable $T_H$) or, optionally, could be adjusted to increase (if Diff is less than the Lower Threshold variable $T_L$) the network bandwidth required of the video signal transmitted in the connection 220. The degree to which the transmit bit rate should be changed, and how this change is achieved is resolved by the video parameter regulator 210.

After the message is queued the value of $t_2$ is updated at step 632 to add a predetermined constant $\Delta_2$ (refer to above description of FIG. 4) to the current real time (t). As described earlier $t_2$ is used in step 602 to prevent further notification while the effect of the most recent notification is settling down in the system.

Any suitable combinations of video parameters may be adjusted by Video Parameter Regulator 210 to achieve the desired new network bandwidth including methods described in the following Magor patent applications, the contents of which are herein incorporated by reference: U.S. patent application Ser. No. 12/232,496 'Low latency Video encoder'; U.S. patent application Ser. No. 12/289,946 'Stable Video Rate Adaptation for Congestion Control'; U.S. patent application 61/243,277 'Spatial Scalable Video Coding'; U.S. patent application Ser. No. 12/575,666 'Network Weather Office' and references to other methods therein; and U.S. patent application Ser. No. 12/489,977 'Desync I-Frames'

Figure 15:
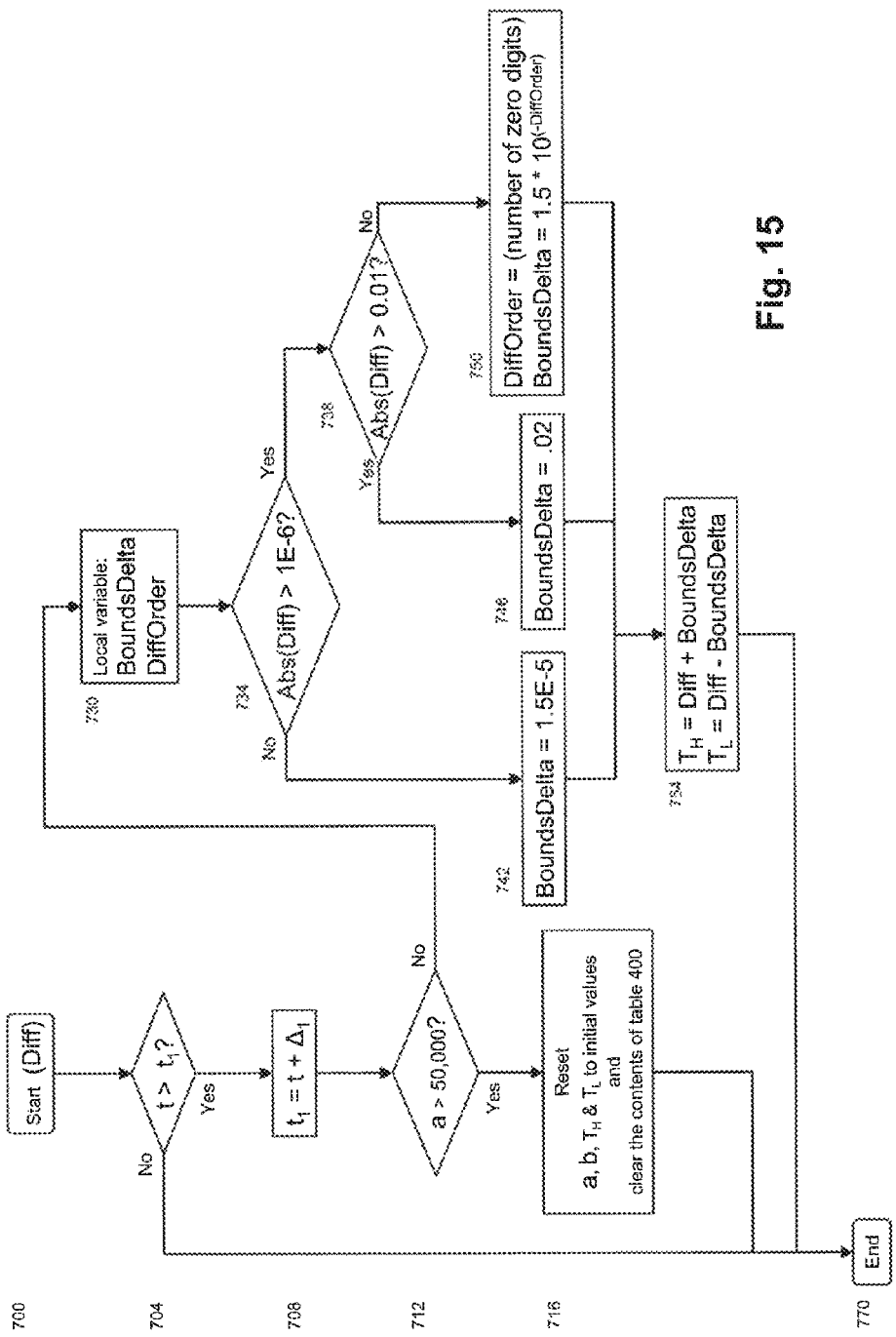
FIG. 15 is a chart showing the generation of bounds.

The process shown in FIG. 15, which is called at step 616, illustrates the process used to set upper and lower Thresholds and other 'house keeping' tasks. Many variations are possible and we simply present one process used in an embodiment of the invention.

The process runs infrequently in the order of a large fraction of a second. This is controlled by $t_1$. If the current real time (t) has not yet reached $t_1$ then step 704 directs the process to end at step 770. Otherwise the next threshold update Time ($t_1$) is set at step 708, by adding $\Delta_1$ as explained with reference to FIG. 4.

Following this Gamma distribution parameter a is tested at step 712. If a is greater than 50,000, typically every 5 to 10 minutes, then the Gamma distribution parameters a and b are reset at step 716. Furthermore, all rows of the shape history table 400 are erased and $T_H$ and $T_L$ are reset to their initial values. The process ends at step 770.

If the overall process is not reset then new thresholds are calculated starting at step 730. Local variables used here are BoundsDelta and DiffOrder. The current value of Diff was passed to this sub process by the calling process, i.e. at step 616.

One of the routes 734 and 738 is taken depending on the absolute value of Diff (i.e. ignoring any minus sign on Diff). If Diff is less than 1E-6 734 the BoundsDelta is set to 1.5E-5. If the absolute value of Diff is greater than 0.01 738 then the BoundsDelta is set to 0.02.

If the absolute value of Diff is greater than 1E-6 but less than 0.01 738 then setting of BoundsDelta 750 depends on the decimal order of magnitude of Diff. That is to say the number of zero digits after the decimal point (e.g. if Diff=0.0057 then DiffOrder=2). This could determined in a number of known ways e.g. by string manipulation or calculation.

Once the variable BoundsDelta has been calculated then upper and lower thresholds $T_H$ and $T_L$ are calculated at step 754 by adding or subtracting respectively BoundsDelta to/from Diff. Following this step the process ends at step 770 returning to the calling process. As stated above $T_H$ and $T_L$ are stored in table 420 and used in processing subsequent packets up until real time t is determined 704 to exceed $t_1$ again.

All connections shown in FIG. 1 comprise two similar connections one in each direction. In the case of star topology conferences employing and MCU the invention may be adapted to the MCU 16. For example a network congestion predictor 236 would be associated with each input leg, sending a notification back to the associated leg source, and the video parameter regulator 210 would be associated with each output leg receiving notification from the associated leg destination.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Moreover, it will be understood that the blocks described herein can be implemented as software modules.

The invention claimed is:

1. A method of controlling the transmission of real time transport packets over a network, comprising:
   monitoring incoming packets received over the network from a transmitter;
   performing a statistical analysis of the received packets to determine network congestion; and
   sending a message to the transmitter to control a transmission parameter in accordance with the determined network congestion.

2. A method as claimed in claim 1, wherein statistical analysis is performed using Bayesian statistics.

3. A method as claimed in claim 1, wherein the statistical analysis is performed on weighted values of packet inter-arrival times $D_i$.

4. A method as claimed in claim 1, wherein the statistical analysis is performed on a parameter $J_i$ defined by the expression $$J_i = \frac{D_i}{\text{Size of packet}(i)}.$$

5. A method as claimed in claim 4, wherein the statistical analysis is performed on the basis that the parameter $J_i$ follows a Pareto distribution with fixed minimum and shape parameters.

6. A method as claimed in claim 5, comprising computing a shape parameter for the Pareto distribution, computing moving averages for the shape parameter, and sending said message when the difference between said moving averages exceed defined bounds.

7. A method as claimed in claim 6, wherein when the ith packet arrives (i>n2) the difference is computed as $$\text{Diff}_i = MA_i(n_1) - MA_i(n_2), \quad (8)$$

where $$MA_i(n) = \frac{\sum_{i-n+1}^{i} \rho_i}{n} \text{ for } i \geq n \quad (9)$$

8. A method as claimed in claim 7, wherein the shape parameter for the Pareto distribution is updated upon the arrival of each packet, and a new estimate of the shape parameter computed in accordance with the equation:

$$\rho_n = E(\rho) = (\alpha_0 + n)b_n$$

where $\rho_n$ is the expectation value of the shape parameter after the arrival of the $n^{th}$ packet.

9. A method as claimed in claim 1, wherein the transmission parameter comprises the bit rate.

10. A method as claimed in claim 1, wherein the transmission parameter comprises a coding parameter.

11. A real time communication system using a real time transport protocol, comprising:
    a receiver for receiving the packets over a network from a remote transmitter and outputting a data stream; and
    a network congestion computation module at the receiver for determining network congestion based on incoming packets, said network congestion computation module being configured to perform a statistical analysis of the received packets to determine network congestion and to send a message to the transmitter to control a transmission parameter in accordance with the determined network congestion.

12. A real time communication system as claimed in claim 11, wherein the network congestion module is configured to perform said statistical analysis is performed using Bayesian statistics.

13. A real time communication system as claimed in claim 11, wherein the network congestion module is configured to perform the statistical analysis on weighted values of packet inter-arrival times $D_i$.

14. A real time communication system as claimed in claim 13, wherein the statistical analysis is performed on a parameter $J_i$ defined by the expression $$J_i = \frac{D_i}{\text{Size of packet}(i)}.$$

15. A real time communication system as claimed in claim 14, wherein the statistical analysis is performed on the basis that the parameter $J_i$ follows a Pareto distribution with fixed minimum and shape parameters.

16. A real time communication system as claimed in claim 15, wherein the network congestion module is configured to compute a shape parameter for the Pareto distribution, compute moving averages for the shape parameter, and send said message when the difference between said moving averages exceed defined bounds.

17. A real time communication system as claimed in claim 16, wherein when the ith packet arrives (i>n2) the network congestion module is configured to compute the difference Diff as $$\text{Diff}_i = MA_i(n_1) - MA_i(n_2), \quad (8)$$

where $$MA_i(n) = \frac{\sum_{i-n+1}^{i} \rho_i}{n} \text{ for } i \geq n \quad (9)$$

18. A real time communication system as claimed in claim 17, wherein the network congestion module is configured to update the shape parameter for the Pareto distribution upon the arrival of each packet, and a new estimate of the shape parameter computed in accordance with the equation:

$$\rho_n = E(\rho) = (\alpha_0 + n)b_n$$

where $\rho_n$ is the expectation value of the shape parameter after the arrival of the $n^{th}$ packet.

19. A real time communication system as claimed in any one of claims 11 to 18, wherein the transmission parameter comprises the bit rate.

20. A real time communication system as claimed in any one of claims 11 to 18, wherein the transmission parameter comprises a coding parameter.

* * * * *